Sept. 8, 1959 W. F. JESSUP ET AL 2,903,116
CONVEYING AND BANKING TRACK
Filed July 7, 1958 2 Sheets-Sheet 2

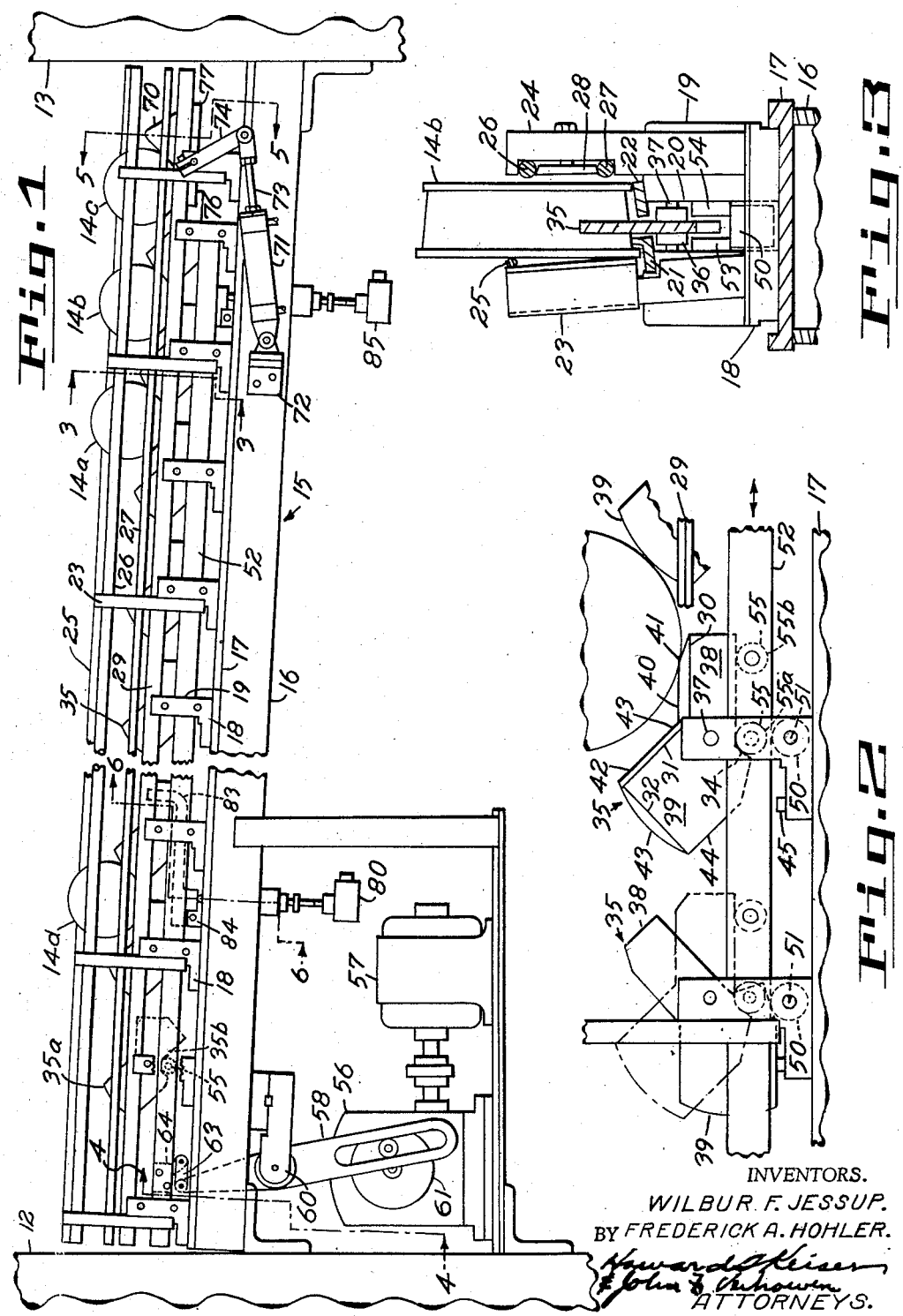
Sept. 8, 1959    W. F. JESSUP ET AL    2,903,116
CONVEYING AND BANKING TRACK
Filed July 7, 1958
INVENTORS.
WILBUR F. JESSUP.
BY FREDERICK A. HOHLER.
ATTORNEYS.

INVENTORS.
WILBUR F. JESSUP.
BY FREDERICK A. HOHLER.
ATTORNEYS.

United States Patent Office 2,903,116
Patented Sept. 8, 1959

2,903,116

CONVEYING AND BANKING TRACK

Wilbur F. Jessup, Cincinnati, Ohio, and Frederick A. Hohler, Holden, Mass.; said Jessup assignor to The Cincinnati Milling Machine Co., Cincinnati, Ohio, a corporation of Ohio, and said Hohler assignor to The Heald Machine Company, Worcester, Mass., a corporation of Delaware Application July 7, 1958, Serial No. 746,799

9 Claims. (Cl. 193—40)

The present invention relates to tracks for the transportation of workpieces and more particularly to a track which will automatically move workpieces between machine tool stations on an integrated production line and bank, or store, the workpieces until required.

In the handling of workpieces between machine tool stations on an integrated production line where each workpiece is operated on successively at the stations thereof, two functions are important if the individual stations of the line are to be kept operating at maximum efficiency. First, it is, of course, necessary that the workpieces be physically moved from one station to the next. Secondly, to avoid shutting down all stations when the machine of any one station on the line becomes inoperative, it is necessary to store workpieces between the stations. Proper storage requires two things: a supply, or bank, of workpieces available to be operated on by the machine at the next station even if the machine at the preceding station is down, and space to store workpieces completed at the preceding station which is available even if the next station is down.

In a track connecting successive stations which is capable of performing these functions it is necessary that a workpiece be capable of movement thereover while other workpieces thereon are at rest, and such movement must be possible even if one or both of the connected work stations is down. Each workpiece which is delivered to the track must be moved downstream and banked there even if the downstream station is down in order to be available when operation of that station resumes. While the workpieces constituting the bank are at rest at the downstream end of the track the following workpieces must be moved to the downstream end to build up the bank and make space available for succeeding workpieces. Even if the upstream station goes down all workpieces on the track must be capable of movement downstream as the downstream station consumes workpieces from the bank. Moreover, this independent movement of workpieces must be accomplished without damage to the workpieces, and, since a finishing operation may have already been performed on a portion of the workpiece, preferably without contact between the workpieces. It is also desirable that the movement of the workpieces be at a controlled rate so that surface damaging impact is avoided.

It is, therefore, an object of the present invention to provide a track which will automatically move a workpiece downstream between machine tools independently of the movement of other workpieces therebetween and independently of the operation of the upstream and downstream machine tool.

It is another object of the present invention to provide a track which will automatically move workpieces downstream between machine tools and bank the same at the downstream end thereof.

It is still another object of the present invention to provide a track which will automatically move workpieces between machine tools without contact therebetween.

It is a further object of the present invention to provide a track which will automatically move workpieces downstream between machine tools at a controlled rate toward a bank at the downstream end thereof.

It is yet another object of the present invention to provide a track which will automatically move workpieces downstream between machine tools with intermittent motion.

It is an additional object of the present invention to provide a track between machine tools which is of simple construction, positive operation, and effective to provide automatically space at the upstream end thereof to receive workpieces and a bank of workpieces at the downstream end thereof.

In brief, in the preferred embodiment of the present invention, movement of the workpieces along the track is achieved partly by gravity and partly by the periodic swinging of a plurality of longitudinally spaced cradle defining flippers. The flippers, which normally fall to a first, or workpiece receiving, position with only the forward portion thereof in the path of the workpieces, are positively swung periodically to a second, or workpiece delivery, position with only the rear portion thereof in the path of the workpieces. This positive swinging action is achieved by a reciprocating shuttle which simultaneously engages all flippers in the first position when it is moved in one direction to swing those flippers to the second position. As the shuttle moves in the opposite direction the flippers, unless otherwise held in the second position, fall back to the first position. Each workpiece, as it moves downstream, moves from flipper to flipper with intermittent motion. The workpiece is stopped at each flipper because it does not have enough inertia to swing the flipper from the workpiece receiving to the workpiece delivery position but must, instead, await the positive swinging motion of the flipper to carry it past the flipper.

A gate is provided at the downstream end of the track to hold workpieces on the track until called for. A workpiece in contact with the gate will be over the forward portion of the next upstream flipper and hold that flipper in the second position with the rear portion thereof in the path of the workpieces to shield the workpiece from contact with approaching workpieces. When that flipper is thus held in the second position it is disengaged from the reciprocating shuttle, and, since the flippers are not connected to the shuttle, it is stationary but the upstream flippers are still periodically swung from the first position to the second position to continue to move workpieces towards the downstream end.

As the next workpiece reaches the downstream end of the track it is stopped by the rear portion of the flipper adjacent the gate and is held over the forward portion of the next flipper, holding that flipper in the second position with its rear portion in the path of the workpieces to shield the second workpiece from approaching workpieces. Thus, a bank, or supply, of workpieces is built up at the downstream end of the track, each workpiece being separated from adjacent workpieces by the flippers which are held disengaged from the shuttle. At the same time the remaining flippers continue to swing and move workpieces towards the bank, increasing the space at the upstream end of the track for the receipt of additional workpieces. While each workpiece is moved positively and independently of other workpieces on the track, at no time can a workpiece build up speed which would result in surface damaging impact because each workpiece is stopped as it reaches each flipper.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 1 is an elevational view of the track of the present invention;

Fig. 2 is a fragmentary view showing in elevation the operation of the flippers;

Fig. 3 is a view through section 3—3 of Fig. 1;

Figure 7A:
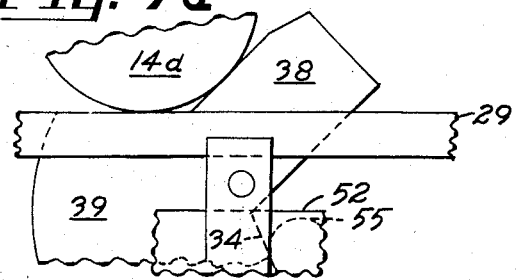
Figure 7B:
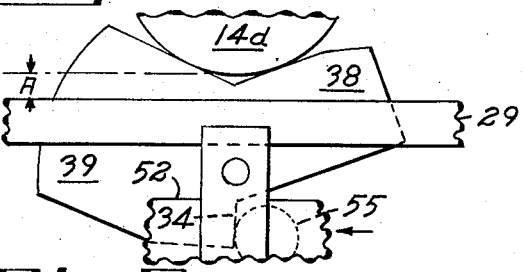
Figure 7C:
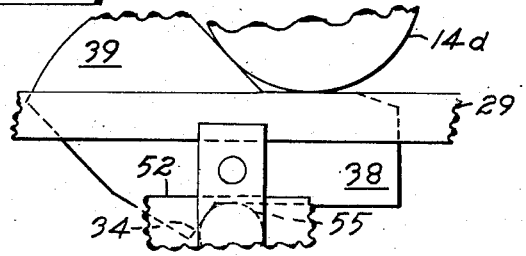

Figs. 7a, 7b, and 7c are schematic views showing the flipper with a workpiece in the cradle thereof in the first, or workpiece receiving position, in an intermediate position, and in the second, or workpiece delivery, positon, respectively, and showing that portion of the race upon which the workpiece rolls.

The track 15 extends between two work stations represented in Fig. 1 by the upstream elevator 12 which delivers workpieces to the track, and a downstream lowering device 13 which receives workpieces from the track when required at the downstream station. Workpieces 14a, 14b, and 14c, are shown banked at the downstream end of the track waiting until called for by the next station. Workpiece 14d is shown on the upstream portion of the track moving along the path defined thereby towards the bank. The parts, as shown for illustrative purposes, are railroad cone bearings.

Figure 4:
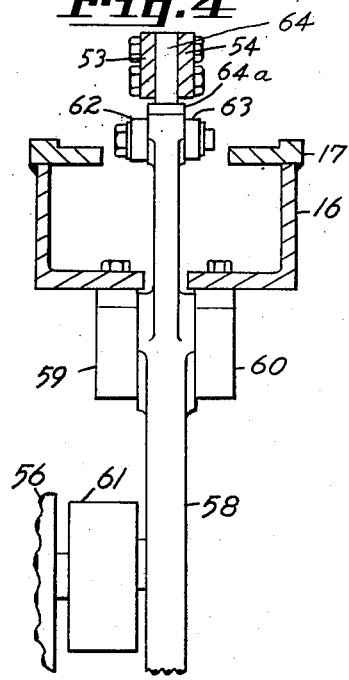
Fig. 4 is a view through section 4—4 of Fig. 1.

The track 15, as shown in Fig. 1, is inclined slightly downwardly in the forward direction toward the downstream end of the track. The track 15 has an elongated upturned channel 16 with a plate 17 across the open top thereof and supported by the legs of the channel as shown in Fig. 4. As shown in Fig. 1, a plurality of brackets 18 are connected to the top of the plate 17 and extend across the plate at longitudinally spaced intervals. Each bracket 18 has an upstanding leg 19 with a vertical central slot 20, as shown in Fig. 3. Two elongated rails 21 and 22 extending longitudinally of the track are connected on top of the legs 19, one on each side of the slot 20, and define a race 29 for the workpieces. Two posts 23 and 24 are connected to each leg of every other bracket 18 and extend upwardly therefrom straddling the rails 21 and 22. The post 23 at the top thereof carries an elongated rod 25. The opposite post 24 receives spaced rods 26 and 27 in a recess in the inboard edge thereof which are held therein by a wedge clamping block 28. These rods, which extend longitudinally of the track, prevent workpieces from leaving the race.

A flipper 35 having a hub 36 is pivotally mounted in the upper portion of the slot 20 of each bracket on a pin 37 which extends through the hub 36 and into the leg 19, as shown in Figs. 2 and 3. The flipper has a forward, or downstream, portion 38 and a rear, or upstream, portion 39. The forward portion 38 has a top surface 40 with a downwardly sloping forward edge 41, and the rear portion has a top surface 42, an end surface 43, and a bottom surface 44. The top surfaces of the forward and rear portions and the rear end of the rear portion may have pads 30, 31, and 32 respectively of a plastic laminate, such as Formica, connected thereto better to protect the workpieces. The top surfaces 40 and 42 of the forward and rear portions respectively of the flipper join at an angle of less than 180° to define a cradle 43 with sufficient span to receive the parts. The flipper 35, and hence the cradle 43, is swingable between a first, or receiving, position, shown in solid lines on the left hand flipper of Fig. 2, and a second, or delivery, position shown in dotted lines. In the receiving position, the top surface 42 of the rear portion 39 is substantially parallel to the race and out of the path of the workpieces thereon, while the forward portion extends through the race between the rails into the path of the workpieces.

In the delivery position, the forward portion 38 is parallel to the race and out of the path of the workpieces while the rear portion 39 extends into that path. The flipper is mounted below the race so that a workpiece in the cradle is lifted off the race as the flipper is swung from the first position to the second position.

The rear portion 39 of the flipper 35 is larger than the forward portion 38 and the bottom surfaces of the two portions are connected by a surface which slopes upwardly and forwardly when the flipper is in the delivery position, said surface defining a shoulder 34. The rear portion 39 of the flipper is consequently heavier than the forward portion 38 and hence, in the absence of other forces, the flipper will normally drop into the receiving position where the bottom surface 44 of the rear portion 39 contacts a stop pin 45 on the bracket 18. The moment about the pivot pin 37 created by the difference in weight between the rear and forward portions of the flipper is less than the opposing moment created by the weight of a workpiece over the forward portion of the flipper and contacting that portion so that when a workpiece is over the forward portion of the flipper, the flipper will be held in the delivery, or second, position. The brackets 18, and hence the flippers 35, are spaced longitudinally so that the forward portion 38 of a flipper is less than the length of a workpiece from the end surface of the rear portion of the downstream flipper, so that when a workpiece contacts the end surface of the rear portion of a flipper that workpiece will lie over the forward portion of the next upstream flipper.

A roller 50 is mounted on pin 51 in the lower portion of slot 20 of each bracket 18 below the flippers 35. A shuttle 52 consisting of two elongated spaced parallel bars 53 and 54 is received in the slots 20 between the flippers 35 and the rollers 50. The shuttle 52 is moved longitudinally with reciprocating motion and rides on the rollers 50. Rollers 55 are mounted between the bars 53 and 54 of the shuttle and are spaced longitudinally at intervals equal to the spacing of brackets 18 so that as the shuttle is moved longitudinally the rollers 55 will simultaneously engage shoulders 34 of the flippers 35 which extend downwardly between the spaced bars 53 and 54 of the shuttle as shown in Fig. 3. As shown in Figs. 1 and 4, the longitudinal reciprocating motion is transmitted to the shuttle 52 from the gear reducer 56 which is driven by motor 57. A connecting rod 58 is pivotally connected at its fulcrum between spaced ears 59 and 60 connected to the underside of channel 16 and extends through openings in the channel 16 and plate 17. The rod 58 is pivotally connected at its lower end to the rotating wheel 61 of the gear reducer 56, and at its upper end is pivotally connected to the spaced links 62 and 63. These links straddle and are pivotally connected to a depending lug 64a on block 64 which extends between the bars 53 and 54 of the shuttle and is connected thereto. Thus, the shuttle moves upstream with the rollers 55 moving to the position shown at 55a in Fig. 2 to contact the shoulders 34 of the flippers in the receiving position and swing those flippers from the receiving position to the delivery position. As the shuttle moves downstream, and the rollers 55 move forward to the position shown at 55b, the rollers 55 become disengaged from the flippers, and the flippers which have no workpiece over the forward portion thereof fall back to their normal receiving position. As shown in Fig. 2, the flippers over which a workpiece rests are held in the delivery position and are not moved by the reciprocating action of the shuttle.

Figure 5:
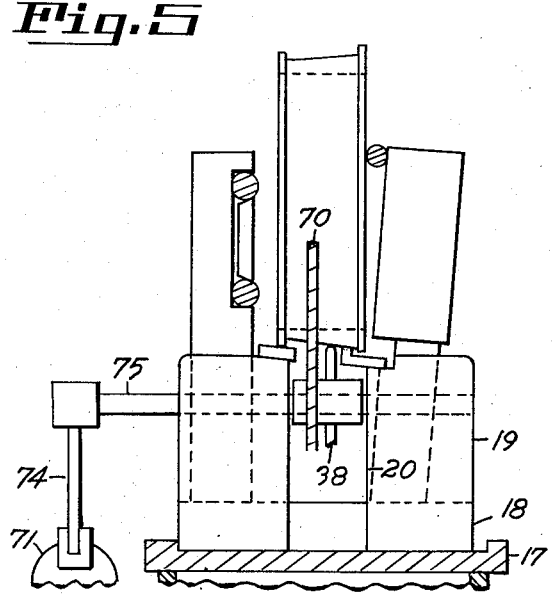
Fig. 5 is a view through section 5—5 of Fig. 1.

The extreme upstream flipper 35a is constructed similarly to the other flippers except that the lower surface 35b of the forward portion thereof slopes downwardly and forwardly when the flipper is in the delivery position, so that the upstream roller 55 of the shuttle remains in engagement with that flipper during the entire shuttle cycle. Thus a workpiece delivered to the track, even though it may have considerable inertia, will be stopped by the first flipper regardless of the position flipper 35a may be in when contacted by the workpiece. The flipper 70 at the downstream end of the track defines a gate and is not connected to the shuttle, but, instead, is positively operated independently to pass workpiece to the lowering device 13 when called for by the mechanism at the next station. As shown in Figs. 1 and 5, the flipper 70 is operated by a pneumatic cylinder 71 which is pivotally connected at one end to bracket 72 secured to the outer surface of one of the legs of channel 16. The piston rod 73, actuated by the cylinder, is pivotally connected at its outer end to the lower end of a link 74. At the opposite end this link is connected to a shaft 75 which passes through the leg 19 of the last downstream bracket 18. The shaft 75 carries, in slot 20 of the bracket, the flipper 70 which has a rear portion 76 and a forward portion 77. The top surfaces of the forward and rear portions are inclined at an angle and define a cradle similar to the cradles of the flippers. When no workpiece is called for by the lowering device 13 the piston rod 73 is extended, and the flipper is held with the forward portion thereof extending through the race and into the path of the workpieces to block the downstream movement of the workpiece and hold the same in the cradle. When a part is called for, piston rod 73 is retracted, and the flipper is rotated to raise the rear portion and lower the forward portion thereof, propelling the part into the lowering device.

Figure 6:
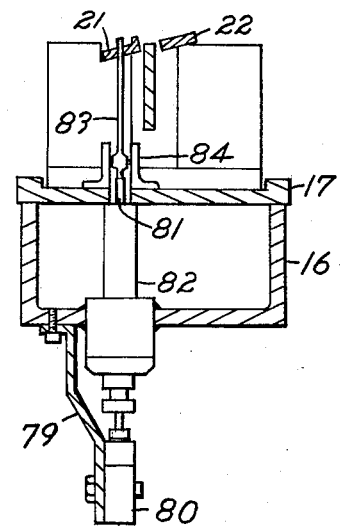
Fig. 6 is a view through section 6—6 of Fig. 1.

A microswitch 80 is installed to operate when a part sits over the forward portion of the third flipper from the upstream end to indicate an almost full bank and to stop delivery of parts thereto. As shown in Figs. 1 and 6, the switch 80 is carried at the end of a bracket 79 connected to one side of the bottom surface of channel 16. A plunger 81 is slidably received in a sleeve 82 which extends through the bottom surface of the channel 16. At one end the plunger is in registration with the switch plunger and at the other end with an arm 83 above the channel. The arm 83 is pivotally mounted at one end between brackets 84 connected to plate 17 and, at its opposite end, extends through a slot in rail 21 adjacent the forward portion of the third flipper from the upstream end. A workpiece on the rail depresses arm 83 which engages and depresses plunger 81 to operate the switch. A second microswitch 85 is similarly mounted at the downstream end of the track for operation when a workpiece is held by the gate to indicate the presence of a workpiece.

When a workpiece such as 14d shown in Fig. 1, is delivered to the track by the elevator 12, it will roll downstream to the first flipper 35a. Depending on the position of that flipper, the workpiece will either roll directly into the cradle thereof and be stopped, or if the flipper is other than in the receiving position, the workpiece will contact the rear end of the rear portion of the flipper and be stopped. In the latter case, when the flipper, which, it will be recalled, is engaged with the shuttle at all times, is returned to the receiving position, the workpiece will roll into the cradle. When the shuttle moves in the upstream direction the workpiece will be carried over the flipper by the swinging action thereof. The workpiece will then contact the rear portion of the next downstream flipper 35 which has just been swung into the delivery position simultaneously with the swinging of the first flipper. As the shuttle moves downstream and disengages from the second flipper which, like all the other flippers except the extreme upstream flipper and the gate flipper, is not positively driven at all times, the flipper will fall to its normal or receiving position, and the workpiece will roll into the cradle thereof. The short roll from the preceding flipper will not give the workpiece sufficient inertia to, of itself, swing the flipper to the delivery position, and hence the workpiece will be stopped as it contacts the cradle, as shown in Fig. 7a.

As shown in Fig. 7b the cradle 43 is pivotally mounted, in relation to race 29, so that the workpiece, to pass the flipper, must be lifted off the race a distance A requiring a force greater than the inertia developed as the workpiece rolls from the preceding flipper so that regardless of the weight of the workpiece it will be stopped by each flipper. The workpiece remains at rest in the cradle until the next upstream movement of the shuttle positively swings the flipper to the delivery position. This carries the workpiece past the flipper and it contacts the next downstream flipper. Thus, as the part 14d moves downstream towards the bank of workpieces at the downstream end, it will move intermittently, being stopped at each flipper.

It will be noted that part 14c is held in position by the gate defining flipper 70 and rests over the forward portion of the next upstream flipper to hold that flipper in the delivery position. In this position, the rear portion of that flipper extends into the path of the workpieces and holds the next upstream workpiece 14b from contact with workpiece 14c. Workpiece 14b is held over the forward portion of the next flipper and holds that flipper in the delivery position. Thus, as a workpiece approaches the bank it contacts the rear portion of the flipper held in the delivery position by the last workpiece in the bank, and, in turn, holds the flipper on which it stops in the delivery position to stop other approaching workpieces. It will be noted that all of the flippers thus held in the delivery position are disengaged from the shuttle and are not moved thereby. Thus, the bank continues to grow if workpieces are not being delivered to the next station until the bank reaches the third from the upstream flipper at which time the elevator at the upstream station is stopped to prevent further workpieces from being delivered to the track.

When the gate is momentarily operated and a workpiece released from the bank, the flipper adjacent the gate over which that workpiece previously rested falls to the receiving position and the next workpiece rolls into its cradle. Hence, the next flipper falls to the receiving position to receive the next workpiece. When the shuttle moves upstream during its cycle all the flippers which have fallen to the receiving position and received workpieces are swung to the delivery position. The downstream workpiece is held by the gate and subsequent workpieces which were carried past their flippers rest on the forward portions thereof, holding the flipper in the second, or delivery, position and out of engagement with the shuttle. In this manner the bank is maintained at the downstream end of the track.

What is claimed is:

1. In a track having an elongated race defining a path on which workpieces are continuously urged forwardly downstream, a mechanism to effect controlled movement in longitudinal spaced relation of said workpieces and to effect banking in longitudinal spaced relation of said workpieces from the downstream end of the track comprising a plurality of longitudinally spaced flippers each having a forward downstream portion and a rear upstream portion, said portions defining a cradle, each flipper pivotally mounted to swing alternately between a workpiece receiving position with the upstream portion thereof out of the path of the workpieces and the downstream portion thereof in said path and a workpiece delivery position with the downstream portion out of the path of the workpieces and the upstream portion in said path, each flipper of the track normally biased to the workpiece receiving position to receive workpieces and hold the same in the cradle while the flipper is in the workpiece receiving position, means periodically to swing the flippers in the workpiece receiving position to the workpiece delivery position, the flippers being held in the workpiece delivery position after being swung to said position while a workpiece is engaged with the forward portion thereof, the span between the rear portion of one flipper and the forward portion of the next upstream flipper being less than the length of a workpiece whereby a workpiece in contact with the rear portion of a flipper when said flipper is in the workpiece delivery position is held engaged with the forward portion of the next upstream flipper to hold said next upstream flipper in the workpiece delivery position.

2. A track for controlled forward movement in longitudinal spaced relation of roller workpieces and the banking thereof in longitudinal spaced relation from the downstream end of the track comprising an elongated race sloping downwardly in the forward direction defining a path along which the workpieces are continuously urged in the downstream direction, a plurality of longitudinally spaced flippers each having a forward downstream portion and a rear upstream portion, said portions defining a cradle, each flipper pivotally mounted adjacent the race to swing alternately between a workpiece receiving position with the upstream portion thereof out of the path of the workpieces and the downstream portion thereof in said path and a workpiece delivery position with the downstream portion out of the path of the workpieces and the upstream portion in said path whereby a workpiece immediately upstream from a flipper in the workpiece receiving position rolls into the cradle thereof and a workpiece immediately upstream from a flipper in the workpiece delivery position contacts the rear portion thereof, each flipper of the track normally biased to the workpiece receiving position to receive workpieces and hold the same in the cradle while the flipper is in the workpiece receiving position, power operated means periodically to swing the flippers in the workpiece receiving position in unison to the workpiece delivery position, the flippers being held in the workpiece delivery position after being swung to said position while a workpiece is engaged with the forward portion thereof, the span between the forward portion of one flipper and the rear portion of the next downstream flipper being less than the length of a workpiece whereby a workpiece moving from the cradle of one flipper swung to the workpiece delivery position contacts the rear portion of said next downstream flipper when said next downstream flipper is in the workpiece delivery position and is held in engagement with the forward portion of said one flipper from which it moved to hold said one flipper in the workpiece delivery position.

3. A track for the forward movement and banking of workpieces of predetermined weight comprising: an elongated race sloping downwardly in the forward direction defining a path for the workpieces; a plurality of longitudinally spaced flippers each having a forward portion and a rear portion and pivotally mounted below the race to swing between a first position with the forward portion thereof extending upwardly through the race into the path of the workpieces and a second position with the rear portion thereof extending upwardly through the race into said path, the rear portion of the flipper being heavier than the forward portion to create a first moment urging the flipper into the first position, the forward portion of the flipper having a conformation to contact a workpiece above said portion when the flipper is in the second position, the weight of the workpiece creating a second moment on the flipper opposite to and greater than said first moment to hold the flipper in the second position; means to hold a workpiece over the forward portion of the flipper when the next forward flipper is in the second position; and means periodically to swing each flipper in the first position to the second position to move a workpiece from a position over the rear portion thereof to a position over the forward portion thereof.

4. A track for the forward movement and banking of workpieces of predetermined weight and length comprising: an elongated race sloping downwardly in the forward direction defining a path for the workpieces; a plurality of longitudinally spaced flippers each having a forward portion and a rear portion and pivotally mounted below the race to swing between a first position with the forward portion thereof extending upwardly through the race into the path of the workpieces and a second position with the rear portion thereof extending upwardly through the race into said path, the rear portion of the flipper being heavier than the forward portion to create a first moment urging the flipper into the first position, the forward portion of the flipper having a conformation to contact a workpiece above said portion when the flipper is in the second position, the weight of the workpiece creating a second moment on the flipper opposite to and greater than said first moment to hold the flipper in the second position, the span between the forward portion of the flipper and the rear portion of the next forward flipper being less than the length of a workpiece whereby a workpiece is held above the forward portion of the flipper when the next forward flipper is in the second position; and means periodically to swing each flipper in the first position to the second position to move a workpiece from a position over the rear portion thereof to a position over the forward portion thereof.

5. A track for the forward movement and banking of workpieces of predetermined weight and length comprising: an elongated race sloping downwardly in the forward direction defining a path for the workpieces; a plurality of longitudinally spaced flippers each having a forward portion and a rear portion with upper surfaces joining at an angle of less than 180°, each flipper being pivotally mounted below the race to swing between a first position with the forward portion thereof extending upwardly through the race into the path of the workpieces and a second position with the rear portion thereof extending upwardly through the race into said path and the forward portion positioned to contact a workpiece above said forward portion, the rear portion of the flipper being heavier than the forward portion to create a first moment urging the flipper into the first position, the weight of a workpiece on the forward portion creating a second moment on the flipper opposite to and greater than said first moment to hold the flipper in the second position, the span between the forward portion of the flipper and the rear portion of the next forward flipper being less than the length of a workpiece whereby a workpiece is held above the forward portion of the flipper to hold the same in the second position when the next forward flipper is in the second position; and means periodically to swing each flipper in the first position to the second position to move a workpiece from a position over the rear portion thereof to a position over the forward portion thereof.

6. A track for the forward movement and banking of roller workpieces of predetermined weight and length comprising: an elongated race sloping downwardly in the forward direction defining a path for the workpieces; a plurality of longitudinally spaced flippers each having a forward portion and a rear portion with upper surfaces joining at an angle of less than 180° to define a cradle, each flipper being pivotally mounted below the race to swing between a first position with the forward portion thereof extending upwardly through the race into the path of the workpieces with the cradle positioned to receive a workpiece and a second position with the rear portion thereof extending upwardly through the race into said path and the forward portion positioned to contact a workpiece above said forward portion, the cradle extending into the path of the parts as the flipper is swung from the first position to the second position, the rear portion of the flipper being heavier than the forward portion to create a moment urging the flipper into the first position, the weight of a workpiece on the forward portion creating a second moment on the flipper opposite to and greater than said first moment to hold the flipper in the second position, the span between the forward portion of the flipper and the rear portion of the next forward flipper being less than the length of a workpiece whereby a workpiece is held above the forward portion of the flipper to hold the same in the second position when the next forward flipper is in the second position; and means periodically to swing each flipper in the first position to the second position to lift a workpiece in the cradle off the race and carry the workpiece from a position over the rear portion thereof to a position over the forward portion thereof.

7. A track for the forward movement and banking of roller workpieces of predetermined weight and length comprising: an elongated race sloping downwardly in the forward direction defining a path for the workpieces; a plurality of longitudinally spaced flippers each having a forward portion and a rear portion with upper surfaces joining at an angle of less than 180° to define a cradle, each flipper being pivotally mounted below the race to swing between a first position with the forward portion thereof extending upwardly through the race into the path of the workpieces with the cradle positioned to receive a workpiece and a second position with the rear portion thereof extending upwardly through the race into said path and the forward portion positioned to contact a workpiece above said forward portion, the cradle extending into the path of the parts as the flipper is swung from the first position to the second position, the rear portion of the flipper being heavier than the forward portion to create a moment urging the flipper into the first position, the weight of a workpiece on the forward portion creating a second moment on the flipper opposite to and greater than said first moment to hold the flipper in the second position, the span between the forward portion of the flipper and the rear portion of the next forward flipper being less than the length of a workpiece whereby a workpiece is held above the forward portion of the flipper to hold the same in the second position when the next forward flipper is in the second position; and an elongated reciprocating shuttle periodically to engage each flipper in the first position and swing said flippers to the second position to lift workpieces positioned over the rear portions of the flippers off the race and carry the same to a position over the forward portions of the flippers.

8. A track for the forward movement and banking of roller workpieces of predetermined weight and length comprising: an elongated race sloping downwardly in the forward direction defining a path for the workpieces; a plurality of longitudinally spaced flippers each having a forward portion and a rear portion with upper surfaces joining at an angle of less than 180° to define a cradle and with lower surfaces defining a shoulder, each flipper being pivotally mounted below the race to swing between a first position with the forward portion thereof extending upwardly through the race into the path of the workpieces with the cradle positioned to receive a workpiece and a second position with the rear portion thereof extending upwardly through the race into said path and the forward portion positioned to contact a workpiece above said forward portion, the cradle extending into the path of the parts as the flipper is swung from the first position to the second position to arrest the movement of workpieces received therein, the rear portion of the flipper being heavier than the forward portion to create a moment urging the flipper into the first position, the weight of a workpiece on the forward portion creating a second moment on the flipper opposite to and greater than said first moment to hold the flipper in the second position, the span between the forward portion of the flipper and the rear portion of the next forward flipper being less than the length of a workpiece whereby a workpiece is held above the forward portion of the flipper to hold the same in the second position when the next forward flipper is in the second position; an elongated longitudinally movable shuttle positioned below the flippers having means to engage simultaneously the shoulders of the flippers in the first position; and means to reciprocate the shuttle to engage periodically said shoulders and swing the flippers in the first position to the second position, thereby lifting workpieces positioned over the rear portions of the flippers off the race and carrying the same to a position over the forward portions of the flippers.

9. A track for the forward movement and banking of roller workpieces of predetermined weight and length between an upstream delivery mechanism and a downstream receiving mechanism which may be operated at different rates comprising: an elongated race sloping downwardly in the downstream direction defining a path for the workpieces; a plurality of longitudinally spaced flippers each having a forward portion and a rear portion with upper surfaces joining at an angle of less than 180° to define a cradle and with lower surfaces defining a shoulder, each flipper being pivotally mounted below the race to swing between a first position with the forward portion thereof extending upwardly through the race into the path of the workpieces with the cradle positioned to receive a workpiece and a second position with the rear portion thereof extending upwardly through the race into said path and the forward portion positioned to contact a workpiece above said forward portion, the cradle extending into the path of the parts as the flipper is swung from the first position to the second position to arrest the movement of workpieces received therein, the rear portion of the flipper being heavier than the forward portion to create a moment urging the flipper into the first position, the weight of a workpiece on the forward portion creating a second moment on the flipper opposite to and greater than said first moment to hold the flipper in the second position, the span between the forward portion of the flipper and the rear portion of the next forward flipper being less than the length of a workpiece whereby a workpiece is held above the forward portion of the flipper to hold the same in the second position when the next forward flipper is in the second position; an elongated longitudinally movable shuttle positioned below the flippers having means to engage simultaneously the shoulders of the flippers in the first position; a motor operatively connected to the shuttle to reciprocate the same to engage periodically said shoulders and swing the flippers in the first position to the second position, thereby lifting workpieces positioned over the rear portions of the flippers off the race and carrying the same to a position over the forward portions of the flippers; a gate at the downstream end of the track operable to release a workpiece to the receiving mechanism when called for; and a switch in the upstream portion of the track operable when the track is banked with a predetermined quantity of parts to stop the delivery mechanism.

No references cited.